United States Patent
Raith et al.

(10) Patent No.: US 6,580,248 B2
(45) Date of Patent: Jun. 17, 2003

(54) DAMPING OR RESONANT PEAKS IN AN ELECTRIC MOTOR WHICH IS OPERATED USING A CONVERTER WITH AN INTERMEDIATE VOLTAGE CIRCUIT, BY MEANS OF A TRANSFORMER-COUPLED DAMPING RESISTANCE, AND A CORRESPONDING ELECTRIC MOTOR

(75) Inventors: Sebastian Raith, Erlangen (DE); Bernd Segger, Erlangen (DE)

(73) Assignee: Siemens Aktiengesellschaft (DE)

( * ) Notice: Subject to any disclaimer, the term of this patent is extended or adjusted under 35 U.S.C. 154(b) by 0 days.

(21) Appl. No.: 09/918,677

(22) Filed: Jul. 31, 2001

(65) Prior Publication Data

US 2002/0093264 A1 Jul. 18, 2002

(30) Foreign Application Priority Data

Nov. 29, 2000 (DE) .......................... 100 59 332

(51) Int. Cl.⁷ ................................. G05B 5/01
(52) U.S. Cl. .................... 318/702; 318/448; 363/40
(58) Field of Search ............... 318/448, 611, 318/702; 363/34, 37, 39, 40, 41

(56) References Cited

U.S. PATENT DOCUMENTS 4,330,817 A * 5/1982 Avar et al. .................. 363/96
5,654,882 A * 8/1997 Kanazawa et al. ........... 363/37
5,990,654 A * 11/1999 Skibinski et al. ........... 318/800
6,208,098 B1 * 3/2001 Kume et al. ................ 318/254
6,288,915 B1 * 9/2001 Stemmler et al. ............ 363/34
6,404,655 B1 * 6/2002 Welches ..................... 363/41

FOREIGN PATENT DOCUMENTS

| DE | 2433618 | 1/1976 |
| DE | 2834378 | 11/1979 |
| DE | 3826282 | 2/1990 |
| EP | 0117764 | 9/1984 |
| EP | 0681361 | 9/1999 |

* cited by examiner

Primary Examiner—Bentsu Ro
(74) Attorney, Agent, or Firm—Baker Botts LLP

(57) ABSTRACT

In a converter system having an intermediate voltage circuit which operates with a supply network-side input inductor in the step-converter mode or has other input-side inductances, there is a risk of natural system oscillations being formed via discharge capacitances in conjunction with motors. If the motor now has an amplitude/frequency response with a pronounced resonant frequency in the region of such natural system oscillations, then there is a risk of higher voltages occurring at the motor star point (S) than in the motor phases (I, V, W). This is prevented by the present invention by introducing an impedance (Z), in particular at the input to the motor, in order to damp capacitive discharge currents to ground potential, which are caused by system oscillations ($f_{sys}$) (excited asymmetrically with respect to ground in the motor phases (U, V, W)) of the converter system ($L_K$, UR, LT, M) in the winding sections.

17 Claims, 8 Drawing Sheets

$f_{res}(sys) \cong f_{sys}$  $f_{res} \cong f_{res}(mot)$

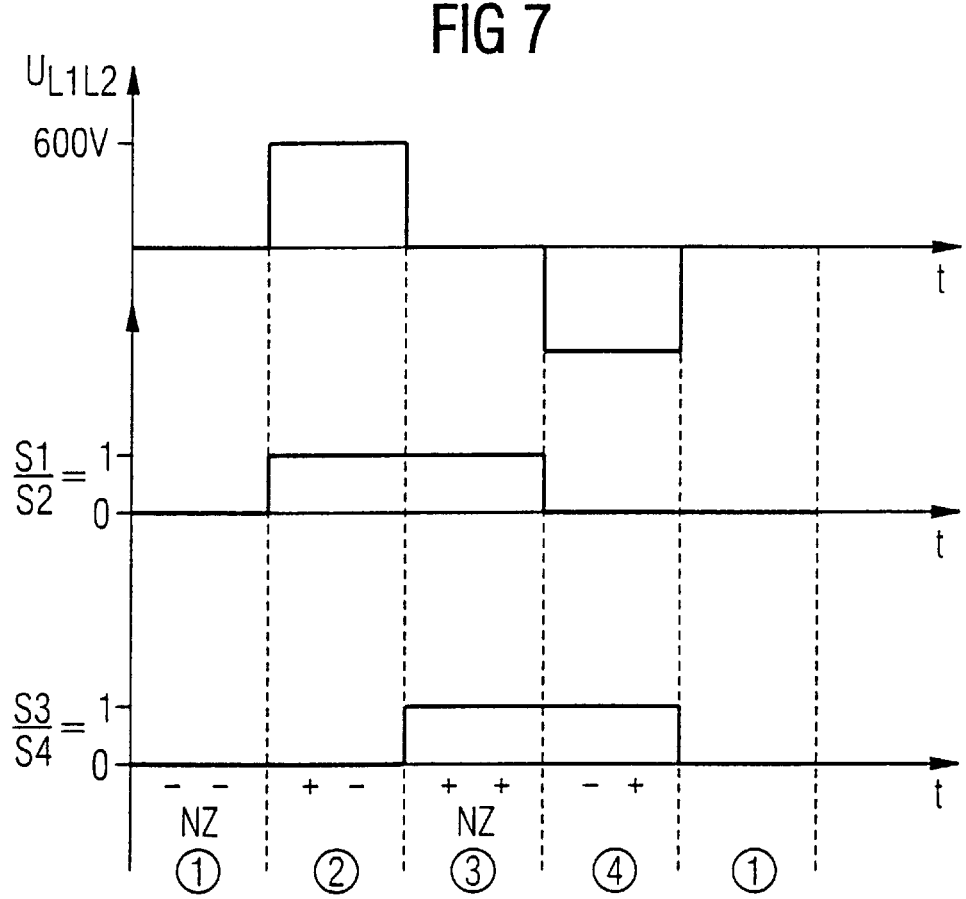
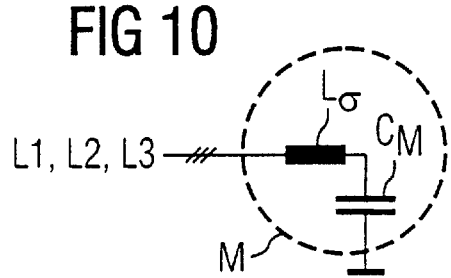

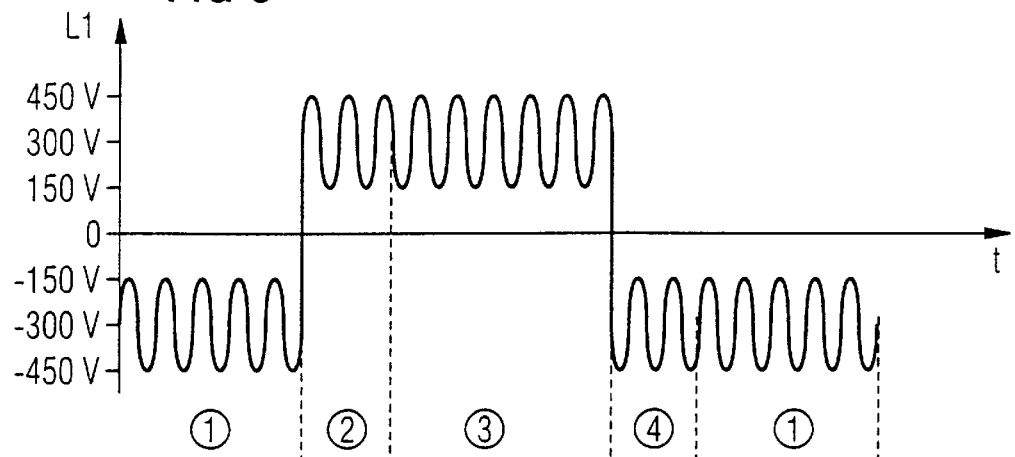
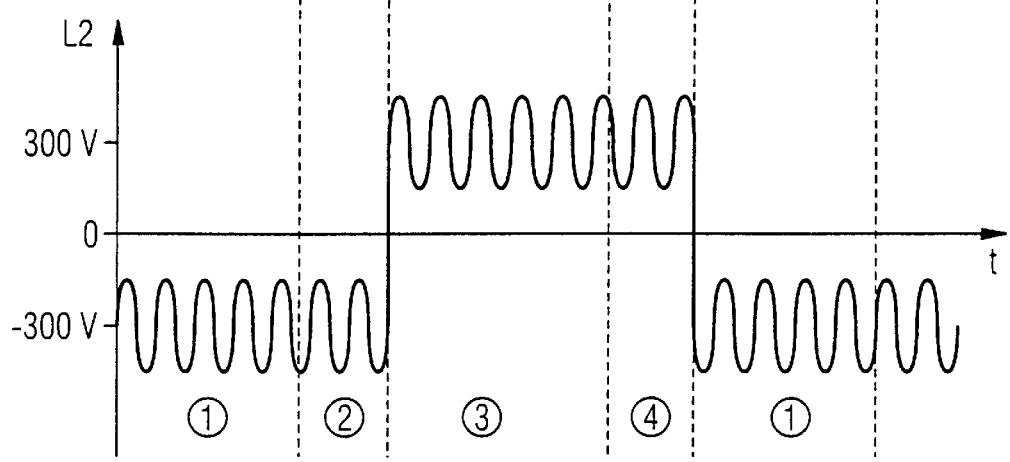

DAMPING OR RESONANT PEAKS IN AN ELECTRIC MOTOR WHICH IS OPERATED USING A CONVERTER WITH AN INTERMEDIATE VOLTAGE CIRCUIT, BY MEANS OF A TRANSFORMER-COUPLED DAMPING RESISTANCE, AND A CORRESPONDING ELECTRIC MOTOR

FIELD OF THE INVENTION

The invention relates to a method for damping resonant peaks at a motor star point in an electric motor which is operated using an intermediate voltage circuit converter with an input-side inductance, in particular a mains system input indicator (supply network-side input inductor,) and which, owing to characteristics of its winding sections, has a frequency response with at least one resonant frequency with respect to ground potential, and to a corresponding electric motor in which resonant peaks are damped in such a manner.

BACKGROUND OF THE INVENTION

In present-day converter systems having an intermediate voltage circuit, in particular in multi-shaft converter systems of this type, system oscillations can be formed which are virtually undamped. This is especially true in converters having an intermediate voltage circuit and a regulated supply in the form of a regulated supply network-side converter, which is also referred to as an input converter.

Converters of this type are used for operating electrical machines with a variable supply frequency. Such an intermediate circuit frequency converter allows an electric motor, for example a three-phase machine such as a synchronous machine, to be operated not only in such a manner that it is linked directly to the supply network and hence has a fixed rotation speed, but also such that the fixed supply network can be replaced by an electronically produced, variable-frequency and variable-amplitude supply for powering the electrical machine.

The two supply systems, (i.e. the supply network whose amplitude and frequency are fixed, and the supply system which supplies the electrical machine with a variable amplitude and frequency), are coupled via a DC voltage storage device or a DC current storage device in the form of what is referred to as an intermediate circuit. In this case, such intermediate circuit converters essentially have three central assemblies:

- a supply network-side input converter which can be designed to be unregulated (for example diode bridges) or to be regulated, in which case energy can be fed back into the supply network only by using a regulated input converter;
- an energy storage device in the intermediate circuit in the form of a capacitor in the case of an intermediate voltage circuit and an inductor in the case of an intermediate current circuit; and
- an output-side converter or inverter for supplying the machine, which generally uses a three-phase bridge circuit having six active current devices which can be turned off, for example IGBT transistors, to convert the DC voltage in an intermediate voltage circuit into a three-phase voltage system.

Such a converter system having an intermediate voltage circuit which, inter alia, owing to its very wide frequency and amplitude control range, is preferably used for main drives and servo drives in machine tools, robots and production machines, is shown in the illustration in FIG. 1.

The converter UR is connected to a three-phase supply network N via filter F and an energy-storage inductor whose inductance is $L_K$. The converter UR has the described converted E, an intermediate voltage circuit with an energy-storage capacitance $C_{ZK}$, and an output inverter W. FIG. 1 shows a regulated converter E which is operated such that it is controlled by switching components (for example a three-phase bridge circuit composed of IGBT transistors), as a result of which the arrangement experiences excitation A1. The inverter W is likewise controlled via further switching components, for example, by means of a three-phase bridge circuit having six IGBT transistors. As a result of those switching operations the inverter W experiences excitation A2 of the system. The capacitor $C_{ZK}$ in the intermediate voltage circuit is connected between the positive intermediate circuit rail P600 and the negative intermediate circuit rail M600. The inverter is connected on the output side via a line LT, having a protective-ground conductor PE and a shield SM, to a motor M in the form of a three-phase machine.

The fixed-frequency three-phase supply network N now supplies the intermediate circuit capacitor $C_{ZK}$ via the input converter E and via the filter F and the energy-storage inductor $L_K$ by means of the regulated supply, with the input converter E (for example a pulse-controlled converter) operating together with the energy-storage inductor $L_K$ as a step-up converter. Once current flows into the energy-storage inductor $L_K$, it is connected to the intermediate circuit and drives the current into the capacitor $C_{ZK}$. The intermediate circuit voltage may therefore be greater than the peak value of the supply network voltage.

This combination effectively represents a DC voltage source. The inverter W uses this DC voltage in the described manner to form a three-phase voltage system in which case, in contrast to the sinusoidal voltage of a three-phase generator, the output voltage does not have the profile of an ideal sinusoidal oscillation, but also has harmonics in addition to the fundamental, since it is produced electronically via a bridge circuit.

However, in addition to the described elements in such an arrangement, it is also necessary to consider parasitic capacitances which assist the formation of system oscillations in such a converter system. Thus, in addition to the filter F with the discharge capacitance $C_F$, the input converter E, the inverter W and the motor M also have discharge capacitances $C_E$, $C_W$ and $C_M$ to ground. Furthermore, there is also a capacitance $C_{PE}$ in the line LT to the protective-ground conductor PE, and a capacitance $C_{SM}$ in the line LT to the grounded shield SM.

It has now been found that these system oscillations are excited to a particularly pronounced extent in the converter E. Depending on the control method chosen for the supply, two or three phases of the supply network N are short-circuited, in order to pass current to the energy-storage inductor $L_K$. If all three phases U, V, W are short-circuited, then either the positive intermediate circuit rail P600 or the negative intermediate circuit rail M600 is hard-connected to the star point of the supply network (generally close to ground potential depending on the zero phase-sequence system component). If two phases of the supply network N are short-circuited, then the relevant intermediate circuit rails P600 and M600 are hard-connected to an inductive voltage divider between the two supply network phases.

Depending on the situation relating to the supply network voltages, this voltage is in the vicinity of ground potential (approximately 50–60 V). Since the intermediate circuit capacitance $C_{ZK}$ is generally large (continuous voltage profile), the other intermediate circuit rail is 600 V lower or higher and can thus also break down the remaining phase of the supply network. In both cases, the intermediate circuit is particularly severely deflected from its "natural" balanced steady-state position (±300 V with respect to ground), which represents a particularly severe excitation for system oscillation.

With respect to the production of undesirable system oscillations, the frequency band below 50 to 100 kHz area, which is relevant for the application, allows a resonant frequency to be calculated based on concentrated elements. In this case, the discharge capacitances $C_F$ to ground in the filter F are generally so large that they do not have a frequency-governing effect. In this case, it can be assumed that dominant excitation to oscillations takes place upstream of the described capacitances, and that the filter discharge capacitance $C_F$ can be ignored.

The resonant frequency $f_{res}(sys)$ of this system, which is referred to as $f_{sys}$ in the following text, is thus given by: where $$f_{sys} = \frac{1}{2\pi\sqrt{L_\Sigma \cdot C_\Sigma}} \quad (1)$$

where $$L_\Sigma = L_K + L_F \quad (2)$$

where $L_K$ represents the dominant component and $L_F$ the unbalanced inductive elements acting on the converter side in the filter (for example current-compensated inductors); and $$C_\Sigma = C_E + C_W + C_{PE} + C_{SM} + C_M \quad (3)$$

This relationship is shown in FIG. 2. In this case, $L_\Sigma$ and $C_\Sigma$ form a passive circuit, which is excited by excitation A and starts to oscillate at its natural resonant frequency $f_{sys}$.

Accordingly, in addition to the shifts with an amplitude of 600 V, for example, that occur during operation, an additional, undesirable oscillation with an amplitude of up to several hundred volts is also modulated onto the voltages of the intermediate circuit rails P600 and M600.

In electric motors M in general, but in particular if they are designed using field coil technology (for example torque motors), a frequency response with pronounced resonant peaks with respect to ground potential can occur if such motors are excited in the common mode with respect to ground at all the motor terminals, for example due to the undesirable system oscillations described above.

These resonant points can be explained by an unbalanced equivalent circuit comprising a lattice network circuit K of parasitic elements (inductances L and discharge capacitances C) in the motor winding, as in FIG. 3 which shows the winding section of one phase U of a three-phase motor M with the three phases U, V, W whose winding sections are electrically connected to one another at the motor star point S. The input voltages of the three-phase current generated by the inverter W are applied to the outer terminals, which are opposite the star point S, of the respective winding sections.

This applies in particular to motors using field coil technology, in which individual four-pole networks in the lattice network K are possible by virtue of the construction, and essentially correspond to a single field coil. In field coil technology, the magnetic cores, which are composed of magnetic steel laminates, have teeth which act as pole cores, which are placed onto the prefabricated coils and are connected as appropriate. The individual inductances L are, as can be seen in FIG. 3, electrically connected in series, with each field coil being capacitively coupled to the pole core (magnetic steel laminate) on which the coil is fit. These respective capacitances are represented as discharge capacitances C to ground, which are formed by the magnetic core.

However, the described phenomenon can also be explained in the case of motors with a different construction (for example using what is referred to as wild winding) by a model of a lattice network K, by this model representing an equivalent circuit with identical four-pole networks in the form of LC tuned circuits, whose elements simulate the frequency response. The peak in this case occurs in the region of the star point S, which is normally not deliberately subjected to voltage loads. If the system oscillation of the converter system occurs in the vicinity of a natural motor frequency, then the insulation system to ground can be overloaded, in particular at the star point S, leading to premature failure of the motor M, since, due to resonance, considerably higher voltages can occur at the motor star point than at the motor terminals.

This is true for all voltage levels (low-voltage, medium-voltage and high-voltage systems), but particularly when the step-up converter principle is used (with the energy-storage inductor $L_K$) on the converter side UR and a frequency response with pronounced resonant peaks with respect to ground potential occurs on the other side in the motor M as is the case in motors with a particularly low natural motor frequency because the natural damping in the motor resulting from eddy current losses and hysteresis losses etc. is particularly low.

Similar problems arise repeatedly in the field of electrical machines when transient overvoltages occur. The overvoltages are thus limited in order to avoid flashovers. For example, according to German patent document DE-A-38 26 282, a voltage-dependent metal-oxide resistor is connected in parallel with a coil in order to limit overvoltages. In German patent document DE-B-28 34 378, winding sections are short-circuited in order to damp quadrature-axis field. In a similar way, according to German patent document DE-A-24 33 618, transient overvoltages in a synchronous machine are damped by means of quadrature-axis field damper bars.

Furthermore, European patent document EP-A-0 117 764 describes how overvoltages which occur due to resonance phenomena can be suppressed by ferroelectric insulators between the coil windings. Finally, European patent document EP-B-0 681 361 addresses the problem of higher-order harmonic oscillations, which can occur in converters and rectifiers using power thyristors. The damper winding is in consequence connected to capacitors in order to form tuned circuits. The tuned circuits have a resonant frequency which is six times as high as the fundamental frequency of the synchronous machine. Higher-order harmonic oscillations on a fundamental can thus be absorbed. Nevertheless, the problem of possible resonant peaks at the star point S of a motor M still remains.

SUMMARY OF THE INVENTION

It is an object of the present invention to avoid resonant peaks excited by such system oscillations in an electric motor operated using such a converter system. This object is achieved by a method for damping resonant peaks at a motor star point in an electric motor which is operated using an intermediate voltage circuit converter with an input-side inductance, in particular a supply network-side input inductor, and which, owing to characteristics of its winding sections, has a frequency response with at least one resonant frequency with respect to ground potential, in that an impedance for damping capacitive discharge currents to ground potential, which are caused in the winding sections, is introduced into all the motor phases leading to a motor star point. For this purpose, this impedance is designed for capacitive discharge currents which are caused by system oscillations (which are excited asymmetrically with respect to ground in the motor phases) of the converter system.

It has also been found to be preferred if all the motor phases leading to a motor star point are routed through a lossy magnetic coupling core. In this case, the losses required for damping can advantageously be produced by the characteristics of the magnetic material itself. Alternatively, this can be achieved if the coupling core, for example a magnetic core, has a winding which is short-circuited via an impedance. In this case, it has been found to be advantageous, particularly with regard to possible retro-fitting of motors, for all the motor phases leading to a motor star point to be routed through the lossy magnetic core at the input to the motor. If the impedance is a non-reactive resistance, then this results in a particularly simple and cost-effective implementation.

On the basis of the knowledge that each winding section of the motor forms an LC lattice network, the resistance of the non-reactive resistor is preferably determined by:

$$R_a \geq \frac{1}{2} \cdot \frac{1}{3} \cdot \sqrt{\frac{L}{C}}$$

where L is the inductance and C the discharge capacitance of one lattice network element in the LC lattice network structure.

The total inductance of the coupling circuit formed with the magnetic core is preferably given by:
where, $$L_{HI} \geq \frac{R}{2\pi f_0},$$

where, $$f_0 \leq \frac{1}{2} \cdot f_{res},$$

with $f_{res}$ being a pronounced resonant frequency in the amplitude/frequency response of the motor.

In this case, the method according to the present invention can also be used for an electric motor having a number of motor star points, in particular for a linear motor or a torque motor, by carrying out the method for each motor star point, and with a suitable impedance in each case being coupled into all the motor phases leading to a motor star point. In this case as well, the impedance can be transformed in at the motor input, in which case it is then sensible to route all the motor phases to all the motor star points through a single coupling core, which must be dimensioned as appropriate. A torque motor is a machine which is designed to produce high torques, generally at low rotation speeds, for example in the form of a brushless synchronous motor with a large number of poles and permanent-magnet excitation.

If the converter is operated together with a supply network input inductor in order to provide a supply based on the step-up converter principle, then the invention results in significant advantages with regard to undamped system oscillations.

Furthermore, the object of the present invention is also achieved by an electric motor using an intermediate voltage circuit converter having an input-side inductance, in particular a supply network input inductor, having a frequency response, which is governed by characteristics of its winding sections with at least one resonant frequency with respect to ground potential, and in which all the motor phases leading to a motor star point are routed through a lossy magnetic coupling core. This can be easily achieved by using the characteristics of the magnetic material itself to produce the losses required for damping, or by the magnetic core having a winding which is short-circuited via an impedance. It preferred for the magnetic core to be arranged at the input to the motor. Since this impedance is designed for damping capacitive discharge currents with respect to ground potential which are caused by system oscillations (excited asymmetrically with respect to ground in the motor phases) of the converter system in the winding sections, system oscillations of the converter system can be suppressed particularly effectively, together with resonant peaks produced by them in the motor, on the basis of a passive circuit, particularly in conjunction with a supply network-side input inductor. It is particularly preferred for the impedance to be a non-reactive resistance. The value of this non-reactive resistance and of the total inductance is preferably governed by the same rules as for the method according to the invention, where $$R_a \geq \frac{1}{2} \cdot \frac{1}{3} \cdot \sqrt{\frac{L}{C}} \text{ and } L_{HI} \geq \frac{R}{2\pi f_0}.$$

The success of the invention can in this case be improved further by the coupling core being constructed such that it does not enter saturation at any operating point of the motor. The solution proposed by the present invention has been found to be particularly advantageous for motors with winding sections using field core technology, which each form a lattice network structure composed of inductances L and discharge capacitances C, with the impedance being used for transformer damping of these lattice network structures. This is achieved particularly well if the impedance is designed such that it damps common-mode currents, which are excited asymmetrically with respect to ground in the motor phases, of the converter system in the lattice network structure.

However, the principle of the invention can also be applied to any other desired forms of electric motors, particularly also those using what is referred to as wild winding technology, in particular low-voltage motors. This has been found to be particularly advantageous for such drives whose geometric dimensions are large and in which large slot areas result in large discharge capacitances, which lead to particularly low resonant frequencies $f_{res}$. This is because the risk of resonant peaks at the motor star point is low provided such pronounced resonant points of the motor are well above any possible converter system oscillations. However, the situation changes, the closer such resonant frequencies in the frequency response of a motor with respect to ground potential are in the region of such converter system oscillations. This relates primarily to the physical size of the motor. The size of a motor governs the slot area which itself affects the capacitance $C_M$ of the motor with respect to ground potential, since this discharge capacitance increases with the size of the slot area. As the discharge capacitance $C_M$ of the motor increases, the pronounced resonant frequency $f_{res}$ in the amplitude/frequency response of the motor with respect to ground potential in turn falls and thus comes closer to the region of undesirable natural system frequencies $f_{sys}$ of the converter system. This means that, as the geometric dimensions of the motor, for example the physical length or the diameter, increase, pronounced resonant frequencies come closer to this critical region, and the problem of resonant peaks becomes more severe.

The present invention effectively counteracts this by means of the measures described above by providing a means for changing the frequency response of the motor with respect to ground potential such that there are now virtually no pronounced resonant peaks $f_{res}$ in the vicinity of the natural system frequencies $f_{sys}$ of the converter system shown in FIG. 1.

BRIEF DESCRIPTION OF THE DRAWINGS

Further details and advantages of the invention will be apparent from the following description of an exemplary embodiment and in conjunction with the drawings, wherein elements having the same functionality are denoted by the same reference symbols. In the figures:

FIG. 7 shows a timing diagram of the voltage profile between these two phases L1 and L2, compared to the switching states of the inverter W;

FIG. 8 shows a timing diagram of the voltage profile of the phase L1 with respect to ground;

FIG. 9 shows a corresponding timing diagram of the voltage profile of the phase L2 with respect to ground;

FIG. 10 shows an outline sketch of an unbalanced drive for the motor comprising the intermediate voltage circuit as a common-mode system for analysis of phase to ground;

DETAILED DESCRIPTION OF THE INVENTION

Figure 1:
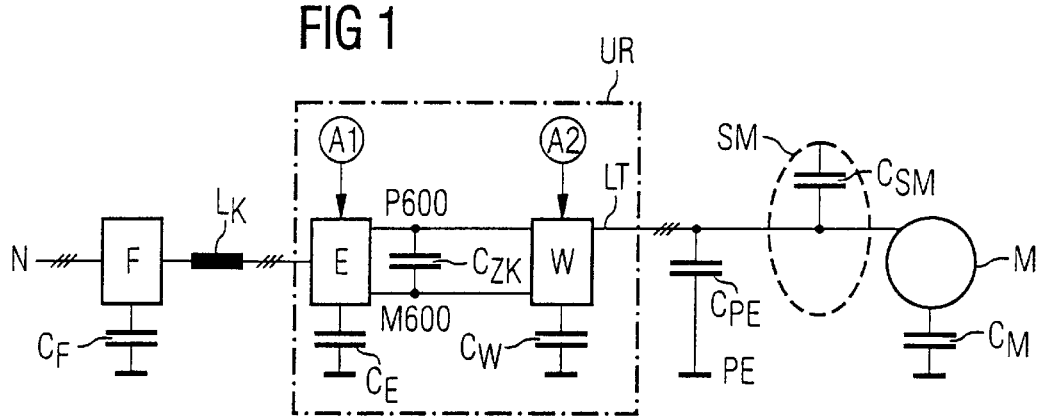
FIG. 1 shows a block diagram of a converter system having a three-phase motor using a converter with an intermediate voltage circuit and a controlled input converter, and a supply network input inductor in the step-up converter mode.
Figure 2:
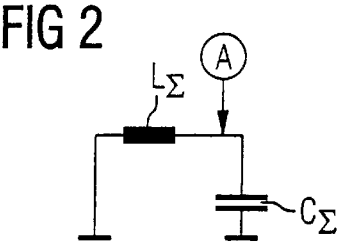
FIG. 2 shows an equivalent circuit of the passive circuit, formed by the arrangement of a converter system shown in FIG. 1, with regard to system oscillations.
Figure 3:
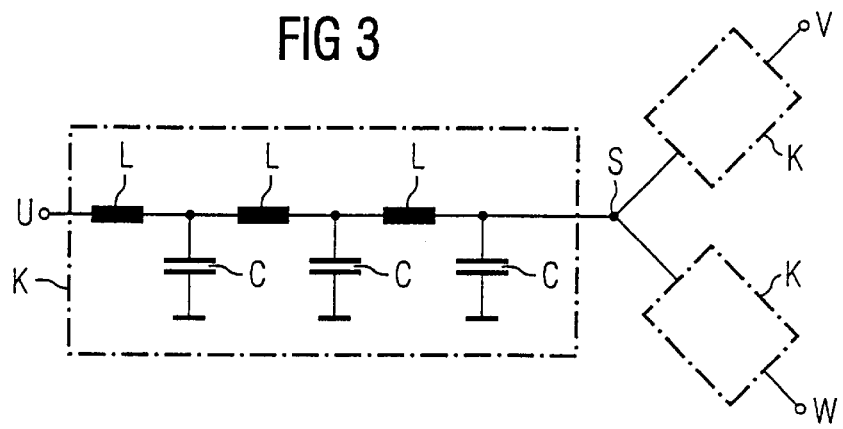
FIG. 3 shows an outline sketch of a lattice network structure formed in a motor.

FIG. 1 to FIG. 3 have been explained in the introduction in order to assist in understanding the problems which the present invention addresses, although it should again be mentioned that the recognition of the problem of system oscillations in a converter system as shown in FIG. 1, particularly with a supply network-side input inductor $L_K$ in the step-up converter mode in conjunction with a motor with a lattice network structure K, and the cause of that problem is not known from the prior art. Hence, the recognition of the problem represents an important aspect of the present invention.

Figure 4:
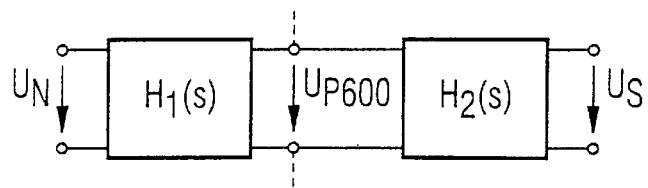
FIG. 4 shows a block diagram system model of the effective path of the voltages with respect to ground potential from the supply network to the motor star point.

The system model of a converter system as shown in FIG. 1 will be analyzed with regard to an effective path from the supply network to the motor star point. To this end, FIG. 4 shows the input-side supply voltage $U_N$ with respect to ground, converted via the converter system, which has a first transfer function $H_1(s)$, to the voltage $U_{P600}$ on the positive intermediate circuit rail with respect to ground. In the motor, voltage $U_{P600}$ is converted via a second transfer function $H_2(s)$ to a voltage $U_S$ with respect to ground which is present at the motor star point S.

Figure 5:
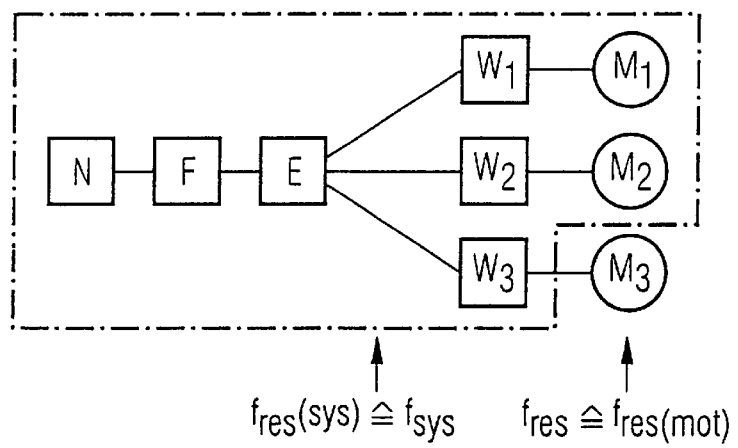
FIG. 5 shows a schematic block diagram of a topology in a converter system.

In practice, a number of motors are frequently operated using one converter system, by a number of inverters $W_1$ to $W_3$ with motors $M_1$ to $M_3$ connected to them being supplied from the intermediate circuit voltage $U_{ZK}$, as shown in FIG. 5. The input converter E is supplied from the supply network N via the filter arrangement F and supplies a number of inverters $W_1$ to $W_3$, with motors $M_1$ to $M_3$ connected to them, from the intermediate circuit voltage $U_{ZK}$.

Between the respective inverters $W_1$ to $W_3$ with connected motors $M_1$ to $M_3$, it must be remembered, with regard to system oscillations, that there is a natural system frequency $f_{sys}$, which describes the resonant frequency $f_{res}(sys)$ of the system, with N, F, E, $W_1$ to $W_3$ on the converter system side. In contrast, the motors $M_1$ to $M_3$ have their own resonant frequency $f_{res}$, which corresponds to the natural frequency $f_{res}(mot)$ of the respective motor.

The theoretical system analysis shown in FIG. 4 is thus carried out separately for each respective motor, for which reason the transfer function $H_1(s)$ represents the effect of the filter F, the inductance $L_K$, the input converter E, all the inverters W, all the other motors M and all the lines LT. Consequently, all of the elements in the dashed box shown in FIG. 5 are modeled as $H_1(s)$ when analyzing the behavior of motor M3.

A system oscillation which is excited in particular by the pulsing of a supply E and, to a lesser extent, also by the pulsing of the inverters W in the shaft modules, can be formed in such a converter or converter system. This pulsing results in periodic changing of the charge on the parasitic capacitances, as has been described with reference to FIG. 1.

If the supply network voltage $U_N$ is regarded as an input variable, then this is mapped by the transfer function $H_1(s)$ onto the output variable $U_{P600}$ (when considering the positive intermediate circuit rail P600). Except for 600 V DC components, the voltage $U_{P600}$ is applied in the common mode to the motor terminals, and this corresponds to an unbalanced system or zero phase-sequence system.

The motor line LT can in theory be associated with both $H_1(s)$ and $H_2(s)$. In this case, as mentioned, the motor line LT will be associated with $H_1(s)$. In the frequency band under consideration, the line LT can be regarded as an electrical short.

As already mentioned, the passive circuit formed in this way and illustrated in FIG. 2 has a natural resonant frequency $f_{res}(sys)$ or $f_{sys}$, at which this system starts to oscillate. Accordingly, in addition to the voltage variations with an amplitude of 600 V, for example, that occur during operation, an additional, undesirable oscillation with an amplitude of up to several hundred volts is also modulated onto the voltages on the intermediate circuit rails P600 and M600. This means that the output voltages from the inverter W with respect to ground are no longer in step-function form, as is the case between two phases U, V, W, with the output voltages now including the system oscillations present on the intermediate circuit rails P600 and M600.

Figure 6:
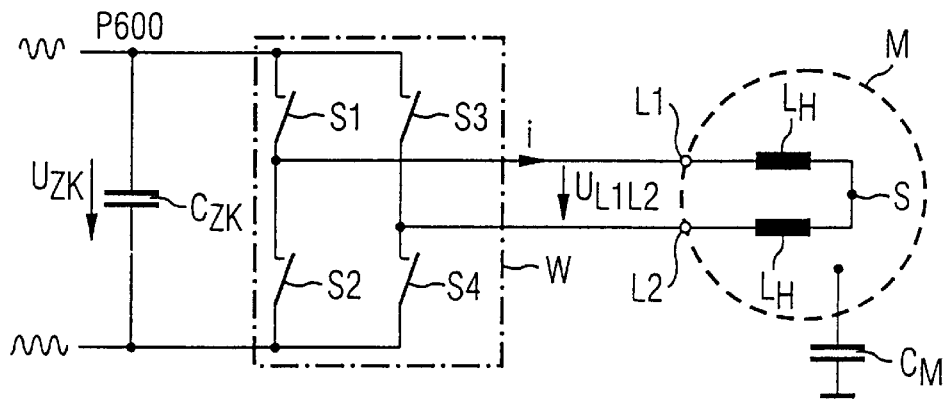
FIG. 6 shows an outline sketch of a balanced drive for the motor comprising the intermediate voltage circuit on the basis of two phases L1 and L2.

This is illustrated in FIG. 6, which shows a balanced drive for the motor M from the intermediate voltage circuit $C_{ZK}$ on the basis of two phases L1 and L2, by way of example. FIG. 6 shows the intermediate circuit with the intermediate circuit capacitance $C_{ZK}$ and the intermediate circuit rails P600 and M600, from which, using a simplified inverter in the form of a bridge circuit with the switches S1 to S4, a voltage $U_{L1L2}$ or a current i is produced in order to supply two sections L1 and L2 of the motor M, which are connected at the motor star point S, each having inductances $L_H$. The motor has the previously described discharge capacitance $C_M$ with respect to ground potential.

FIG. 7 shows the profile of the voltage $U_{L1L2}$ between the phases L1 and L2 plotted against time t and compared with the respective switching states of the switches S1 to S4 in the bridge of the inverter W, which are plotted underneath, likewise with respect to time t. The switches S1 and S2 represent the first bridge arm, and the switches S3 and S4 represent the second bridge arm. In this case, switches in one phase are always in opposite directions to one another since, otherwise, the intermediate circuit would be short-circuited.

The four states 1, 2, 3 and 4 are assumed in order to illustrate the switching states of the two bridge arms, S1/S2 and S3/S4. In state 1, S1=0, S2=1 and S3=0, S4=1 with the state "−−" for the phases L1 and L2. Thus, in this case, what are referred to as zero vectors NZ are switched and there is no voltage $U_{L1L2}$ between the phases L1 and L2. In state 2, S1=1, S2=0 and S3=0, S4=1. This results in the state "+−", with a voltage $U_{L1L2}$ of 600 V between the phases L1 and L2. In state 3, S1=1, S2=0 and S3=1, S4=0. This results in the state "++", that is to say zero vectors NZ are once again switched, and there is no voltage $U_{L1L2}$ between the phases L1 and L2. Finally, in state 4, S1=0, S2=1 and S3=1, S4=0. This results in the state "−+" with a voltage $U_{L1L2}$ of −600 V between the phases L1 and L2. A new state 1 then starts, etc.

FIG. 8 also shows the voltage of phase L1 with respect to ground, plotted against time t for these states 1 to 4, that is to say considered asymmetrically. In this case, the phenomenon described above can be seen, as a result of which the voltage profile does not have an ideal step-function form since it is modulated with the undesirable system oscillations of the converter system from FIG. 1 and FIG. 4 with an amplitude, for example, of approximately 150 V. The same applies, in some circumstances, to a constant amplitude shift for the unbalanced voltage of phase L2 with respect to ground, which is shown in FIG. 9. As can be seen, both phases L1 and L2, and thus also the intermediate circuit rails P600 and M600, oscillate in time with one another. This means that they are always shifted "in parallel", that is to say without phase shift.

It is clear from this that the problem of resonant peaks is caused by unbalanced currents i. For this reason, it is worthwhile analyzing the arrangement as a common-mode system, a section of which is shown in FIG. 10 in the form of an unbalanced drive for the motor M from the intermediate voltage circuit $C_{ZK}$. In this case it is assumed that all the motor phases U, V, W or L1 to L3 form an inductance $L_o$ which is governed by the motor winding and is terminated by the discharge capacitance $C_M$ to ground.

If one now considers the two phases L1 and L2 jointly, as a common-mode system (referred to as L1&&L2 in the following text) then this results in the voltage with respect to ground over time shown in FIG. 11. No common-mode signal can be shown in the states 2 and 4 in the common-mode system for L1&&L2 from the "parallel" shift of the individual phases L1, L2 which can be seen in FIG. 8 and FIG. 9, since in this case the phases L1 and L2 are at a different potential (in the sketched situation, the DC voltage difference is 600 volts). Since only two phases are considered, they produce an average of zero volts in the common mode. In the other states 1 and 3, the voltage of L1&&L2 over time corresponds to that of L1 in FIG. 8, and L2 in FIG. 9.

Figure 11:
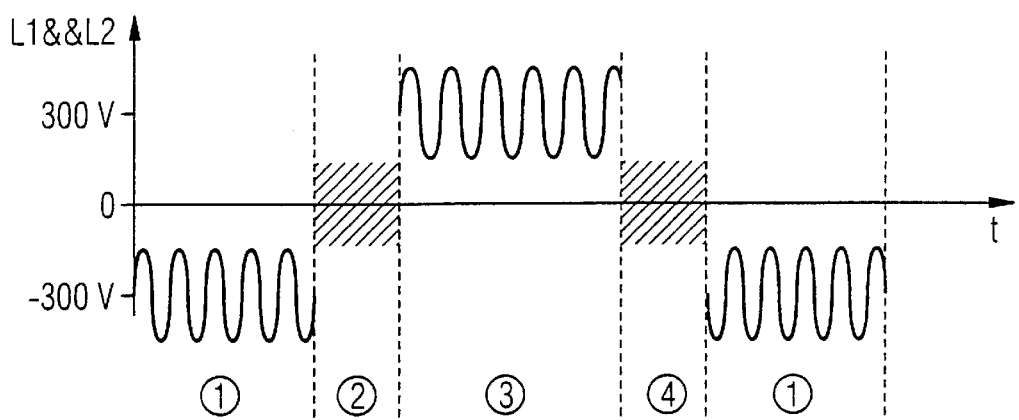
FIG. 11 shows a timing diagram of the unbalanced voltage profile of the phases L1 and L2 with respect to ground.
Figure 12:
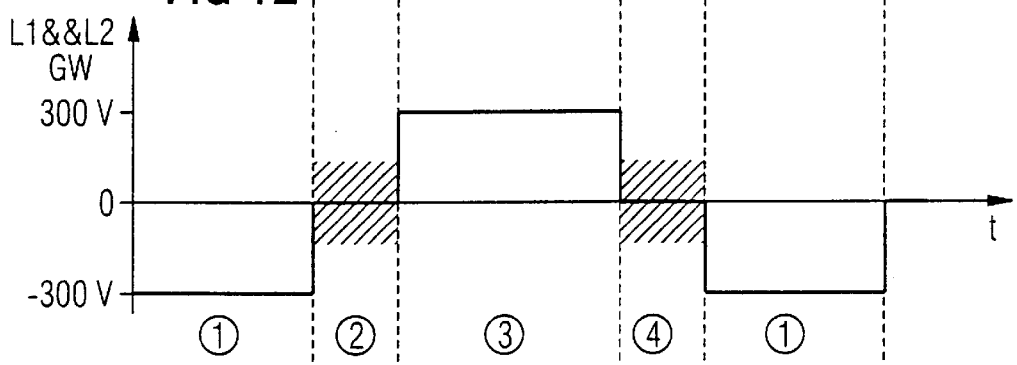
FIG. 12 shows a corresponding timing diagram of the DC component of the unbalanced voltage profile of the phases L1 and L2 with respect to ground.
Figure 13:
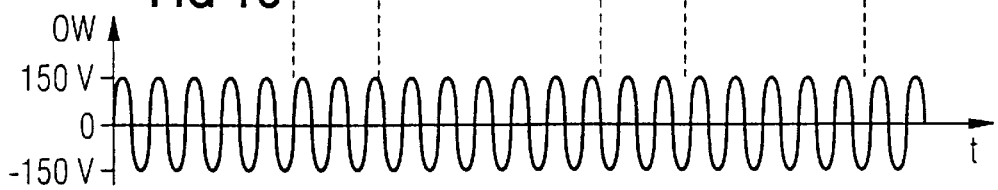
FIG. 13 shows a corresponding timing diagram of the AC component of the unbalanced voltage profile of the phases L1 and L2 with respect to ground.

The voltage of L1&&L2 over time as shown in FIG. 11 in the common-mode system can in this case be separated into a fundamental GW and a harmonic OW. These are shown separately in FIG. 12 and FIG. 13. The illustration in FIG. 12 shows the voltage of the fundamental GW over time. This clearly shows that this voltage profile describes the desired step-function form switching states with −300 V in state 1, 0 V in states 2 and 4 owing to the "parallel" shift, and +300 V in state 3. The harmonic OW of the voltage L1&&L2, shown over time in FIG. 13, describes an essentially constant sinusoidal profile with an amplitude of, for example, 150 V.

The harmonic or system oscillation is thus applied to the motor M in all states 1 to 4, as a result of which this phase-ground tuned circuit is always excited in the motor M, as shown in FIG. 2. If this system oscillation is now in the vicinity of a natural motor frequency, and/or the motor M has a pronounced resonance in the vicinity of the frequency of the system oscillation, undesirable resonant peaks can occur. A "maximum" oscillation amplitude of this phase-ground tuned circuit is generally prevented only by the discontinuities in the harmonic resulting from the switching from one state to the next.

With regard to the theoretical system analysis of the problems shown in FIG. 4, as mentioned above, the amplitude of such a system oscillation $f_{sys}$ in this case depends essentially on two factors. Namely, the intrinsic damping in the system, which is inversely proportional to the Q-factor of the tuned circuit with the damping increasing as the frequency rises, and the excitation, that is to say the nature of the supply (for example diode supply or regulated supply) and the magnitude of the intermediate circuit voltage $U_{ZK}$. Particularly pronounced natural system oscillations can thus be observed in converter systems which have a large number of shaft modules W and motors M, and long motor lines LT. The frequency band of the natural system oscillations $f_{sys}$ in this case generally extends from approximately 10 kHz for large converter systems up to more than 50 kHz for smaller converter systems.

The amplitude and frequency thus depend on the configuration and the extent of the system, for example:
- the nature of the supply E (regulated or unregulated);
- the number of shafts or motors M which are operated using one converter system UR; and
- the length of the power lines LT.

It should thus be stated at this point that converter systems with an intermediate voltage circuit may have natural oscillations on the intermediate circuit rails P600, M600 with respect to ground. These are particularly pronounced in multi-shaft systems and with a regulated input converter E, particularly when used in the step-up converter mode. The motor M in an unbalanced system is thus excited virtually at a single frequency irrespective of the pulse patterns on the individual phases U, V, W or L1 to L3. The transfer function $H_2(s)$ results in this excitation being mapped onto the output side, namely the voltage $U_S$ at the star point S with respect to ground.

Figure 14:
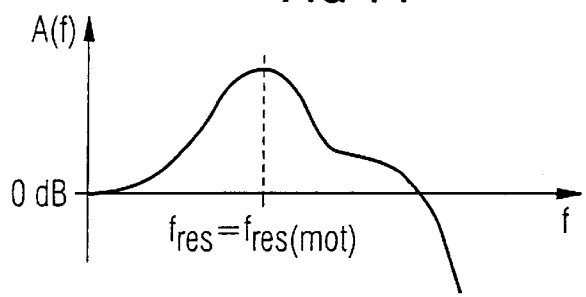
FIG. 14 shows an amplitude/frequency response of a motor with respect to ground in order to illustrate the transfer function $H_2(s)$.

All electric motors M, irrespective of the type, qualitatively have a transfer function $H_2(s)$ with respect to ground whose amplitude/frequency response $A(f)$ is as shown in the illustration in FIG. 14. This has a pronounced resonant frequency $f_{res}$(mot) or $f_{res}$. The transfer function $H_2(s)$ can in this case be described as:

$$H_2(s) = U_{P600}/U_S$$

The frequency of the pronounced resonant peak of the motor depends on the inductive and capacitive elements in the motor with respect to ground, and is thus governed by:

$$f_{res} \propto \frac{1}{\sqrt{L_M \cdot C_M}}$$

where $L_M = f(L_{PE})$ is the effective inductance and $C_M = f(C_{PE})$ is the effective capacitance of the motor M with respect to ground potential PE or in the zero phase-sequence system. The precise functions in this case depend on the respective measurement method and on the equivalent circuits used.

If there are a number of star points S, identical tuned circuits are connected in parallel. The capacitance per tuned circuit is then governed by:

$$\tilde{C} \propto \frac{C_M}{number_S}.$$

The inductance depends on the number of series-connected coils, with there being a number of star points S, particularly when using field coil technology. Since the individual coils can be regarded as being magnetically decoupled from one another, it can furthermore be stated that:

$$\tilde{L} \propto \frac{n_{1S}}{number_S}$$

where $n_{1S}$ is the number of coil assemblies for one star point S, and $number_S$ is the number of star points S.

Thus, for motors of the same physical size but in which identical coil groups are connected differently:

$$f_{res} \propto \frac{1}{\sqrt{\frac{1}{number_S} \cdot \frac{1}{number_S}}} \propto number_S.$$

The influence of the motor size on the resonant frequency $f_{res}$ can be estimated as follows:

$$C = \frac{\varepsilon \cdot A}{d}$$

where $$A \propto \text{slot area} \propto D \cdot LG$$

where D is the diameter and LG the length of the motor.

The influence of the motor size with the characteristics otherwise being constant is thus reflected by:

$$f_{res} \propto \frac{1}{\sqrt{\text{slot area}}} \propto \frac{1}{\sqrt{D \cdot LG}}.$$

Figure 15:
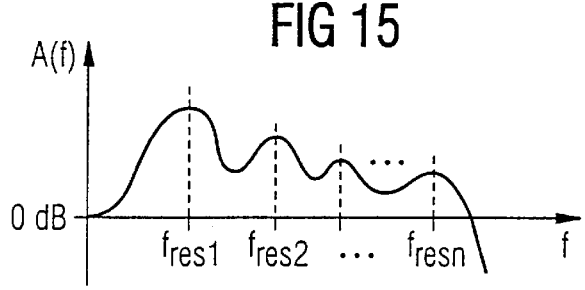
FIG. 15 shows an amplitude/frequency response of a motor with respect to ground ignoring the natural damping, which increases as the frequency rises, in order to illustrate the transfer function $H_2(s)$.

Ignoring the natural damping, which increases as the frequency f rises, resulting from eddy current losses, hysteresis etc. and in particular if the motor M is regarded as a lattice network K, as appears to be macroscopically plausible particularly in the case of motors using field coil technology since the coil groups are connected in series, this results in the amplitude/frequency response $A(f)$ shown in FIG. 15. The response graph $A(f)$ has a number of local maxima which describe a number of resonant frequencies $f_{res\ 1}$ to $f_{res\ n}$, with the first resonant peak $f_{res\ 1}$, which occurs at the lowest frequency, being dominant and thus representing the governing or pronounced resonant frequency $f_{res}$.

There are thus frequencies, particularly the lowest resonant frequency $f_{res}$, at which considerably greater voltages occur at the motor star point S than at the input terminals of the motor M and these are, for example, greater by a factor of 3 to 4. In this case, it can be stated that the resonant peak becomes higher the lower $f_{res}$ is. Geometrically large torque motors are thus particularly at risk, in which resonant points $f_{res}$ which are in the vicinity of or are precisely at the frequency $f_{sys}$ of the natural system oscillations can be formed particularly easily due to the slot area and the number of star points S.

This knowledge is important in considering the lattice network structure K as shown in FIG. 3. This is because such a lattice network structure K can be regarded not only macroscopically in motors using field coil technology, but also, in principle, with other types. To this end, the motor M together with its motor winding can also be regarded in entirely general form as a microscopic lattice network K composed of identical four-pole networks V1 to Vn, as is shown in the illustration in FIG. 16. Each four-pole network V1 to Vn in this case comprises an inductance L, which is connected in series with a non-reactive resistance R. The output voltage is in this case dropped in parallel with a capacitance C, which is connected as a voltage divider with L and R.

Figure 17:
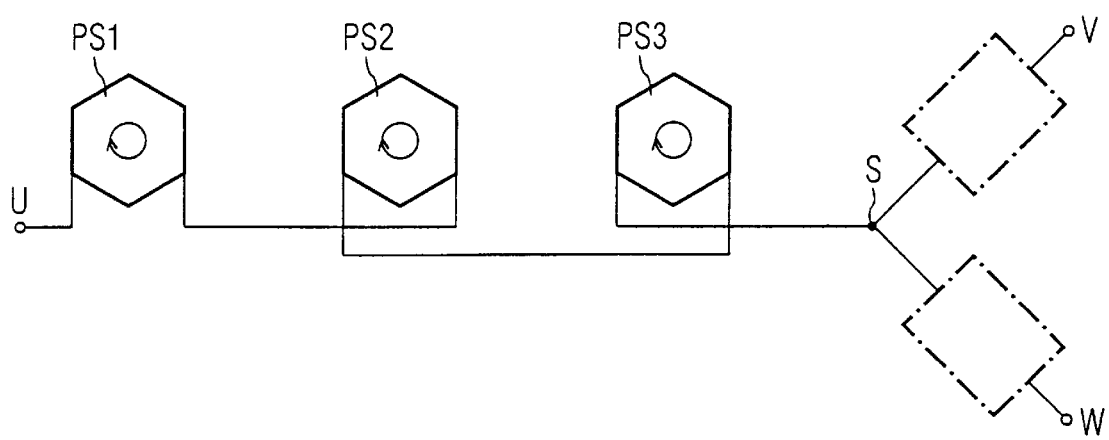
FIG. 17 shows an example of a winding layout of a motor winding using field coil technology.
Figure 18:
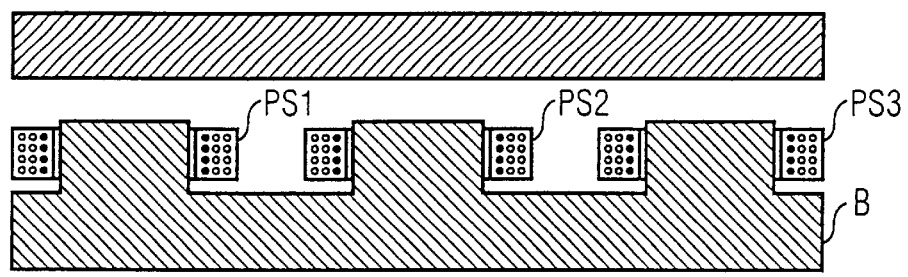
FIG. 18 shows a cross-sectional view of the installed position of these field coils in the laminated core.
Figure 19:
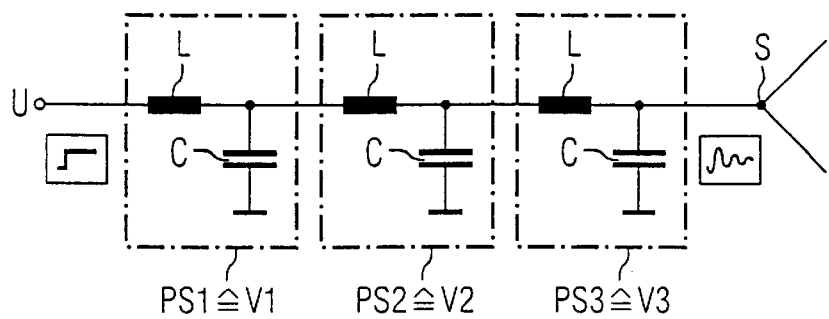
FIG. 19 shows the unbalanced equivalent circuit of such an arrangement as shown in FIG. 17 and FIG. 18.

In order to illustrate this structure, the lattice network structure K will be described in more detail. To this end, FIGS. 17 to 19 show a comparison of the construction of a motor winding using field coil technology on the basis of its unbalanced electrical equivalent circuit. The illustration in FIG. 17 shows a coil group in the phase U. Each coil group of the motor winding MW, comprising a number of series-connected field coils PS1 to PS3, forms with respect to ground a macroscopic LC lattice network with an inductance L and a capacitance C. The start and end of this lattice network K are the input terminal U and star point S of the motor M. As described above, this lattice network K has a number of resonant frequencies $f_{res}$.

If such a lattice network is excited at the input U (phase to ground) for example sinusoidally at its lowest natural frequency $f_{res}$, which is generally the most pronounced, then it can supply a considerably higher voltage at the star point S than at the input U. In the worst case, this voltage can lead to a breakdown in the main insulation in the vicinity of the star point S. Such sinusoidal excitation can occur in particular as a result of inadvertent system oscillation $f_{sys}$ (as described above) of the entire converter system.

The described mechanism is most clearly pronounced when at rest since, in this case, all the phases U, V, W or L1, L2, L3 are switched at the same time. The natural frequencies and damping levels in the lattice network K depend on the construction of the motor winding, for example, on:

the number of coils per path
the number of turns (inductance)
the shape of the coils (capacitance)
the encapsulation (capacitance).

The illustration in FIG. 18 shows how the unbalanced equivalent circuit of such an arrangement as shown in FIG. 19 is obtained from an example of a winding design as shown in FIG. 17 and the installed position of the field coils PS1 to PS3 in the laminated core B.

The winding organization means that the first layer (solid circles) of a field coil PS1 to PS3 always has a larger capacitance C with respect to the laminated core B (ground potential) than the other layers (hollow circles).

The respective inductance L is formed by the respective field coil PSI, PS2, PS3 itself, on the assumption that the mutual inductance between the coils can be ignored since, at the frequencies under consideration (for example 20 kHz), the iron only slightly amplifies and guides the magnetic flux. This is confirmed by the fact that the omission of the secondary part scarcely changes the measured values (frequency, amplitude).

The illustrated structure thus has as large a number of lattice network elements (n=3) as field coils PS1 to PS3. If a winding section comprises m parallel-connected paths (lattice structures), then m=3 paths are connected in parallel for operation with a zero vector NZ (simultaneous switching of all the input terminals) for the phases U, V, W.

The natural damping in the system is not shown in FIG. 19. Initially, this should be regarded as the non-reactive resistance R of each inductance L.

Figure 16:
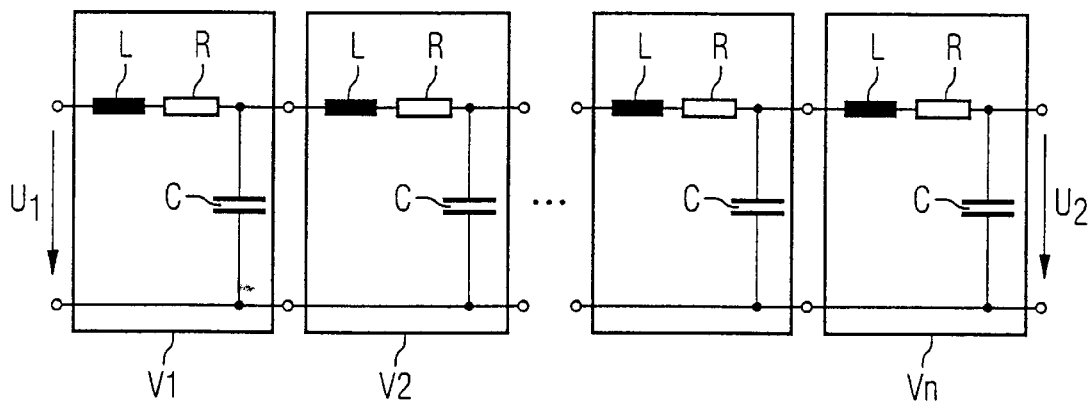
FIG. 16 shows an outline sketch of a lattice network structure formed from four-pole networks.

In the following example, the transfer function of the lattice network structure which is shown in FIG. 16 and comprises the four-pole networks V1 to Vn from the phase terminals to the star point S is calculated for a motor M by using the variables $L_Z$, $C_M$, m and n.

In this case, $C_M$ describes the winding-ground capacitance, and $L_Z$, $R_Z$ describe the impedance of one winding path. The expression winding path in this case means the series-connected coils from one phase terminal U, V or W to a star point S, with any parallel connections which exist within a winding section being disconnected.

This allows the parameters for a lattice network element or four-pole network to be determined as follows:

$$L = \frac{L_Z}{n}$$

$$C = \frac{C_M}{3 \cdot n \cdot m}$$

m: number of parallel paths;
n: number of coils in series.
The loss resistance R of the inductance L is initially set to $$R = \frac{R_Z}{n}$$

with the value for $R_Z$ in the series model being predetermined, for example, 10 kHz.

This value can be only a first approximation, since R is highly frequency-dependent and is determined at a lower frequency than the frequencies which actually occur.

The Z-matrix of an individual four-pole element $Z_v$ is:

$$Z_v = \begin{bmatrix} R + sL + \frac{1}{sC} & \frac{1}{sC} \\ \frac{1}{sC} & \frac{1}{sC} \end{bmatrix}$$

The lattice matrix $A_v$ can be formed as follows:

$$A_v = \begin{bmatrix} s^2LC + sRC + 1 & sL + R \\ sC & 1 \end{bmatrix}$$

The A-matrix for the entire lattice network K is then:

$$A_{tot} = A_v^n$$

with the element $$A_{tot}[1,1] = \frac{U_1}{U_2}$$

The amplitude/frequency response A(s) is thus, as a complex generalization of A(f):

$$A(s) = 20 \lg\left(\left|\frac{1}{A_{tot}[1,1]}\right|\right) \text{ in db}$$

If it is assumed that the damping resistance R increases with frequency, then the higher resonant frequencies would be even more strongly damped.

If the A-matrix for the entire lattice network K is used to form the Z-matrix, then the element $Z_{in}$ is equal to the input impedance of the lattice network.

This results in the input impedance, as follows:

$$Z_{in} = \left|\frac{Z_{tot}[1,1]}{m \cdot n}\right| = \frac{1}{m \cdot n} \cdot \left|\frac{A_{tot}[1,1]}{A_{tot}[2,1]}\right|$$

Figure 20:
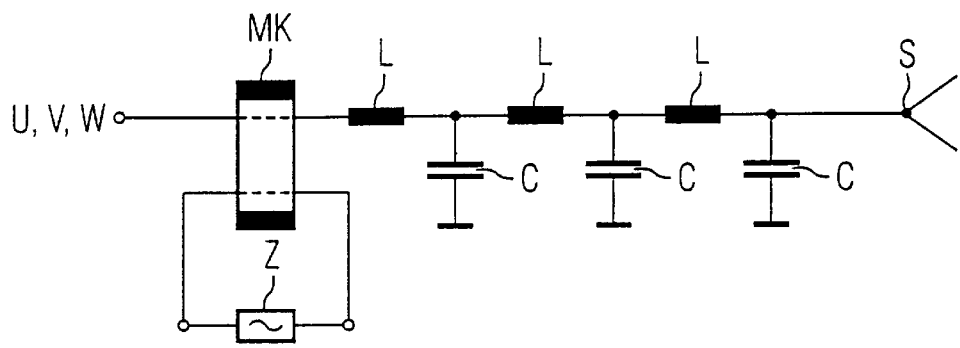
FIG. 20 shows the same lattice network structure as that in FIG. 3 with the transformer-coupled damping resistance according to the invention.

The illustration in FIG. 20 shows a lattice network structure K formed in a motor M, as has been explained with reference to FIG. 3, but now with an impedance Z according to the invention which is transformer-coupled into all three phases U, V, W of the motor M. This is done, for example, by routing each phase U, V, W of the motor M, whose winding section represents a lattice network K, through one and the same magnetic core MK, which is either sufficiently lossy owing to its material characteristics or else has a winding which is electrically short-circuited by an impedance Z (as in FIG. 20). Since all the phases are routed through one magnetic core MK, only the unwanted common-mode processes are damped with respect to the natural system oscillations in the converter system.

Figure 21:
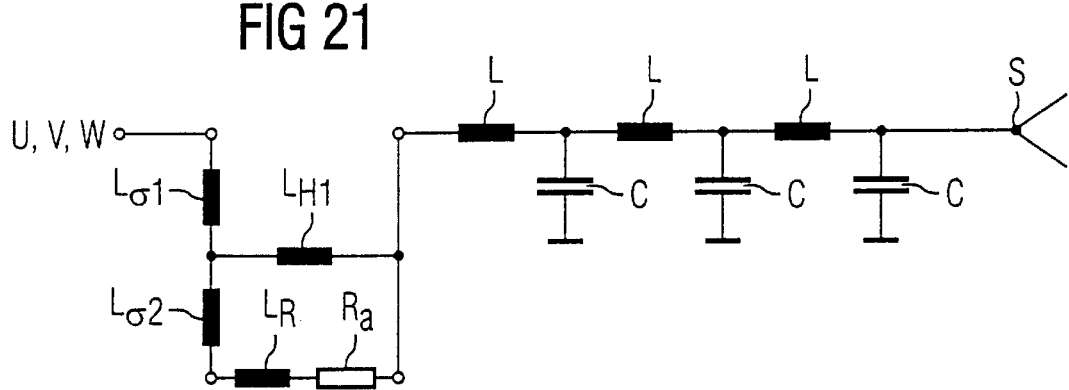
FIG. 21 shows an equivalent circuit for the coupling core and the impedance as shown in FIG. 20.

FIG. 21 shows the transformer equivalent circuit relating to the arrangement shown in FIG. 20. The magnetic core MK is in this case described by the four-pole network equivalent circuit of a transformer with the main inductance of the transformer and the total inductance of the coupling coil $L_{H1}$, together with the stray inductances $L_{o1}$ and $L_{o2}$. The impedance Z is in this case composed of a series circuit formed by a non-reactive damping resistance $R_a$ and a parasitic inductance $L_R$, which is in general formed by the supply lines of the resistance. The impedance Z may, of course, also include other elements such as capacitances, which are used to compensate for $L_{o2}$ and $L_R$.

On the basis of this equivalent circuit for the coupling core MK and the impedance Z, $R_a$ and $L_{H1}$ can now be dimensioned so that a sufficiently large time constant is achieved resulting in a satisfactory damping effect with minimized losses in the impedance Z. To ensure this result, the time constant should correspond to approximately half the lowest motor resonant frequency $f_{res}$.

The resistive component $R_a$ is preferably dimensioned in accordance with $$R_a \geq \frac{1}{2} \cdot \frac{1}{3} \cdot \sqrt{\frac{L}{C}}$$

In this case, L describes the inductance and C the discharge capacitance of a four-pole network V1 . . . Vn, or of a lattice network LC element as illustrated in FIG. 16 or FIG. 19.

The main inductance of the transformer and the total inductance of the coupling core MK are preferably dimensioned in accordance with $$L_{Hl} >= \frac{R}{2\pi f_0},$$

where $$f_0 <= \frac{1}{2} \cdot f_{res},$$

and $f_{res}$ is the pronounced resonant frequency of the motor M.

It can be seen that the inductance $L_{H1}$ should not be reduced by saturation effects. For this reason, the coupling core MK should be dimensioned such that it cannot enter saturation at any operating points.

Figure 22:
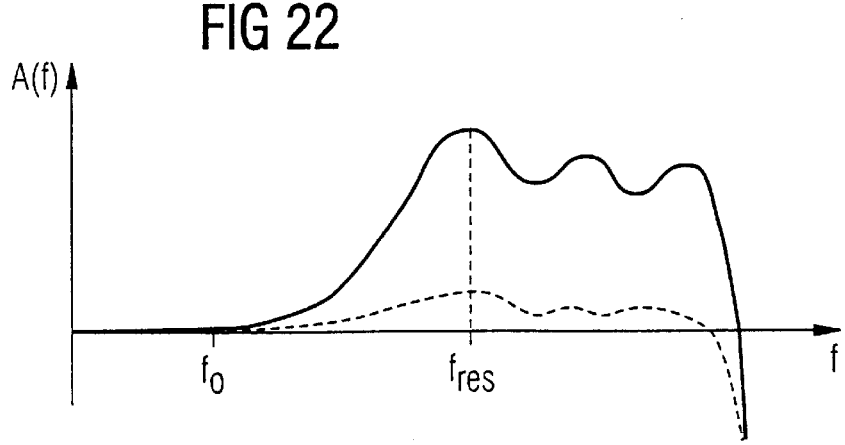
FIG. 22 shows a comparison of the amplitude/frequency response (amplitude profile plotted against the frequency) with and without the transformer-coupled damping resistance.

FIG. 22 shows the amplitude/frequency response A(f) with respect to ground potential with and without the impedance Z being transformer-coupled according to the invention into all three phases U, V, W of the motor M. The solid line corresponds to the undamped situation as shown in FIG. 15, with the first resonant frequency as the most pronounced resonant frequency $f_{res}$. Transformer damping of the unwanted common-mode processes, dimensioned as described above, results in the dotted profile, where the resonant peak at $f_{res}$ is considerably lower. Thus, if this is located in the vicinity of the natural system frequency $f_{sys}$ of the converter system, then there is no need to be concerned about resonant peaks with the described negative consequences.

The advantages of the invention are a reduction in the load on the insulation system with respect to ground, which improves the reliability and robustness of the motor and elimination of the need for expensive additional motor insulation that reduces the rating of the motor, since the voltage load remains in areas which are regarded as capable of handling the voltage load using standard materials based on the present prior art for low-voltage motors.

The foregoing merely illustrates the principles of the invention in exemplary embodiments. Various modifications and alterations to the described embodiments will be apparent to those skilled in the art in view of the teachings herein. For example, the principles of the invention could be applied if there are a number of motor star points S, as is the situation, for example, in linear motors or torque motors. To this end, a suitable impedance Z for each motor star point S is in each case transformer-coupled into all the motor phases U, V, W leading to an individual motor star point S. In principle, resonant peaks also exist in motors using what is referred to as wild winding (standard for low-voltage motors), so that the principles of the invention could be used for these motors and for motors other than the field coil technology motors chosen for illustrative purposes. It will thus be fully appreciated that those skilled in the art will be able to devise numerous systems and methods which, although not explicitly shown or described, embody the principles of the invention and thus are within the spirit and scope of the invention as defined in the appended claims.

We claim:

1. A method for damping resonant electrical peaks at a motor star point in an electric motor which is operated using an intermediate voltage circuit converter with an input-side inductance, said input-side inductance, owing to characteristics of the winding sections of said electric motor, has a frequency response with at least one resonant frequency with respect to ground potential, comprising: introducing into all phase paths leading to at least one motor star point, an impedance for damping capacitive discharge currents to ground potential, which are caused by system oscillations excited asymmetrically with respect to ground in the motor phases of the converter in the winding sections, further wherein all the motor phase paths leading to at least one motor star point-are routed through a lossy magnetic coupling; wherein the coupling core has a winding that is short-circuited via an impedance.

2. The method according to claim 1, wherein said lossy coupling core is coupled to the input to the motor.

3. The method according to claim 1, wherein the impedance comprises a non-reactive resistance.

4. The method according to claim 3, wherein each winding section of the motor forms an LC lattice network, and the non-reactive resistance, $R_a$ is dimensioned in accordance with the formula:

$$R_a \geq \frac{1}{2} \cdot \frac{1}{3} \cdot \sqrt{\frac{L}{C}},$$

where L is the inductance and C the discharge capacitance of one lattice network element in the LC lattice network structure.

5. The method according to claim 3, wherein the total inductance, $L_{H1}$ of a coupling circuit formed with the coupling core is dimensioned in accordance with the formula:

$$L_{HI} >= \frac{R}{2\pi f_0},$$

wherein R is non-reactive resistance, and where, preferably, $$f_0 <= \frac{1}{2} \cdot f_{res},$$

with $f_{res}$ being a pronounced resonant frequency.

6. The method according to claim 1, wherein the converter is operated together with the input-side inductance in order to provide a supply based on the step-up converter principle.

7. The method according to claim 1, wherein the input-side inductance comprises an inductor.

8. An electric motor for operation using an intermediate voltage circuit converter having an input-side inductance and having a frequency response that is governed by winding inductances and discharge capacitances, with a pronounced resonance with respect to ground potential, in which all the motor phase lines leading to a motor star point are routed through a lossy magnetic coupling core, wherein the coupling core has a winding which is short-circuited via an impedance.

9. The electric motor according to claim 8, wherein the coupling core is coupled to at the input to the motor.

10. The electric motor according to claim 8, wherein the impedance is so pronounced that it damps capacitive discharge currents to ground potential, which are caused by system oscillations excited asymmetrically with respect to ground in the motor phases of a converter system in winding sections of the motor.

11. The electric motor according to claim 8, wherein the impedance comprises a non-reactive resistance.

12. The electric motor according to claim 11, wherein each winding section of the motor forms an LC lattice network, and the non-reactive resistance, $R_a$, is dimensioned in accordance with the formula:

$$R_a >= \frac{1}{2} \cdot \frac{1}{3} \cdot \sqrt{\frac{L}{C}},$$

where L is the inductance and C the discharge capacitance of one lattice network element in the LC lattice network structure.

13. The electric motor according to claim 12, wherein the impedance is so pronounced that it damps common-mode currents excited asymmetrically with respect to ground in the motor phases of a converter system in the lattice network structure.

14. The electric motor according to claim 11, wherein the total inductance $L_{H1}$, of a coupling circuit formed with the coupling core is dimensioned in accordance with the formula:

$$L_{HI} \geq \frac{R}{2\pi f_0}, \text{ where preferably, } f_0 \leq \frac{1}{2} \cdot f_{res},$$

with $f_{res}$ being a pronounced resonant frequency.

15. The electric motor according to claim 8, wherein the coupling core is dimensioned in such a manner that it does not enter saturation at any operating point of the motor.

16. The electric motor according to claim 8, further comprising winding sections using field coil technology, wherein each winding section form a lattice network structure composed of inductances and discharge capacitances, in which case the impedance is used for transformer damping of these lattice network structures.

17. An electric motor according to claim 8, wherein said motor employs wild winding technology which has low resonant frequencies by virtue of its construction.

* * * * *